United States Patent
Ward et al.

(10) Patent No.: US 10,844,234 B2
(45) Date of Patent: Nov. 24, 2020

(54) METHOD OF PRINTING

(71) Applicant: FujiFilm Speciality Ink Systems Limited, Broadstairs Kent (GB)

(72) Inventors: Jeremy Ward, Broadstairs Kent (GB); Carole Noutary, Broadstairs Kent (GB)

(73) Assignee: FUJIFILM SPECIALITY INK SYSTEMS LIMITED, Broadstairs Kent (GB)

( * ) Notice: Subject to any disclaimer, the term of this patent is extended or adjusted under 35 U.S.C. 154(b) by 0 days.

(21) Appl. No.: 15/573,423

(22) PCT Filed: May 13, 2016

(86) PCT No.: PCT/GB2016/051386
§ 371 (c)(1),
(2) Date: Nov. 10, 2017

(87) PCT Pub. No.: WO2016/181162
PCT Pub. Date: Nov. 17, 2016

(65) Prior Publication Data
US 2018/0112090 A1   Apr. 26, 2018

(30) Foreign Application Priority Data

May 13, 2015 (GB) .................................. 1508135.9

(51) Int. Cl.
| | | |
|---|---|---|
| *C09D 11/101* | (2014.01) | |
| *C09D 11/107* | (2014.01) | |
| *C09D 11/30* | (2014.01) | |
| *C09D 11/102* | (2014.01) | |
| *B41J 2/01* | (2006.01) | |
| *B41J 11/00* | (2006.01) | |
| *C09D 11/037* | (2014.01) | |

(52) U.S. Cl.
CPC ............. *C09D 11/101* (2013.01); *B41J 2/01* (2013.01); *B41J 11/002* (2013.01); *C09D 11/037* (2013.01); *C09D 11/102* (2013.01); *C09D 11/107* (2013.01); *C09D 11/30* (2013.01)

(58) Field of Classification Search
CPC ..... C09D 11/101; C09D 11/107; C09D 11/30; C09D 11/037; B41J 11/002; B41J 2/01
See application file for complete search history.

(56) References Cited

U.S. PATENT DOCUMENTS

| | | | | |
|---|---|---|---|---|
| 2010/0272966 A1* | 10/2010 | Gould | .................. | C09D 11/101 428/195.1 |
| 2012/0264845 A1* | 10/2012 | Stappers | .............. | C09D 11/101 522/16 |
| 2013/0258018 A1* | 10/2013 | Nakajima | .............. | B41J 11/002 347/102 |
| 2014/0347427 A1* | 11/2014 | Yamashita | ............. | C09D 11/38 347/86 |

FOREIGN PATENT DOCUMENTS

| | | |
|---|---|---|
| EP | 2 546 208 A1 | 1/2013 |
| EP | 2 853 367 A2 | 4/2015 |
| EP | 2 921 536 A1 | 9/2015 |
| EP | 3 002 321 A1 | 4/2016 |
| WO | 2008/004002 A1 | 1/2008 |
| WO | 2012/136593 A1 | 10/2012 |
| WO | 2014/041346 A1 | 3/2014 |
| WO | 2014/188209 A1 | 11/2014 |
| WO | 2015/115600 A1 | 8/2015 |
| WO | 2015/173552 A1 | 11/2015 |

OTHER PUBLICATIONS

International Search Report and Written Opinion for corresponding application No. PCT/GB2016/051386 dated Aug. 11, 2016.

* cited by examiner

*Primary Examiner* — Yaovi M Ameh
(74) *Attorney, Agent, or Firm* — Wood, Phillips, Katz, Clark & Mortimer

(57) ABSTRACT

The present invention provides a method of inkjet printing comprising: inkjet printing an inkjet ink onto a substrate, wherein the inkjet ink comprises a resin having a glass transition temperature of from 25 to 105° C., a radiation-curable material, and a photoinitiator; and exposing the inkjet ink to UV LED light to cure the inkjet ink.

13 Claims, No Drawings

METHOD OF PRINTING

FIELD OF THE INVENTION

The present invention relates to a method of printing, and in particular to a method of inkjet printing utilising UV LED light.

BACKGROUND OF THE INVENTION

In inkjet printing, minute droplets of black, white or coloured ink are ejected in a controlled manner from one or more reservoirs or printing heads through narrow nozzles on to a substrate which is moving relative to the reservoirs. The ejected ink forms an image on the substrate. For high-speed printing, the inks must flow rapidly from the printing heads, and, to ensure that this happens, they must have, in use, a low viscosity, typically below 100 mPas at 25° C. (although in most applications the viscosity should be below 50 mPas, and often below 25 mPas). Typically, when ejected through the nozzles, the ink has a viscosity of less than 25 mPas, preferably 5-15 mPas and ideally 10.5 mPas at the jetting temperature, which is often elevated to about 40° C. (the ink might have a much higher viscosity at ambient temperature). The inks must also be resistant to drying or crusting in the reservoirs or nozzles. For these reasons, inkjet inks for application at or near ambient temperatures are commonly formulated to contain a large proportion of a mobile liquid vehicle or solvent.

In one common type of inkjet ink, this liquid is water— see for example the paper by Henry R. Kang in the Journal of Imaging Science, 35(3), pp. 179-188 (1991). In those systems, great effort must be made to ensure the inks do not dry in the head due to water evaporation. In another common type, the liquid is a low-boiling solvent or mixture of solvents—see, for example, EP 0 314 403 and EP 0 424 714. Unfortunately, inkjet inks that include a large proportion of water or solvent cannot be handled after printing until the inks have dried, either by evaporation of the solvent or its absorption into the substrate. This drying process is often slow and in many cases (for example, when printing on to a heat-sensitive substrate such as paper) cannot be accelerated.

Another type of inkjet ink contains radiation-curable material, such as radiation-curable monomers, which polymerise by irradiation with actinic radiation, commonly with ultraviolet light, in the presence of a photoinitiator. This type of ink has the advantage that it is not necessary to evaporate the liquid phase to dry the print; instead the print is exposed to radiation to cure or harden it, a process which is more rapid than evaporation of solvent at moderate temperatures.

There are a number of sources of actinic radiation which are commonly used to cure inkjet inks which contain radiation-curable material. The most common source of radiation is a UV source. UV sources include mercury discharge lamps, fluorescent tubes, light emitting diodes (LEDs), flash lamps and combinations thereof. Mercury discharge lamps, fluorescent tubes and flash lamps are most commonly used as the radiation source as they generate enough power to thoroughly cure the radiation-curable ink and hence achieve adequate through cure and surface cure. When LEDs are used, it is necessary to use an array of multiple LEDs in order to generate enough power to provide thorough curing of the ink. However, even with an array of multiple LEDs, inks which are cured by LEDs are prone to poor surface cure.

There is therefore a need in the art for a method of inkjet printing an inkjet ink comprising a radiation-curable material, where the source of actinic radiation used to cure the inkjet ink is UV LED light, which has improved surface cure. Improved surface cure provides a drier, tack-free finish of the printed image and improved blocking performance.

BRIEF SUMMARY OF THE INVENTION

Accordingly, the present invention provides a method of inkjet printing comprising: inkjet printing an inkjet ink onto a substrate, wherein the inkjet ink comprises a resin having a glass transition temperature of from 25 to 105° C., a radiation-curable material, and a photoinitiator; and exposing the inkjet ink to UV LED light to cure the inkjet ink.

DETAILED DESCRIPTION OF THE INVENTION

It has surprisingly been found that improved surface cure of the radiation-curable inkjet ink by UV LED light can be achieved by including a resin having a glass transition temperature of from 25 to 105° C. into the ink. The inkjet ink comprising such a resin has been found to be specifically compatible with curing via UV LED light. This advantage is not observed in the absence of such a resin. In this regard, inks comprising other radiation-curable material (other than the resin used in the present invention) do not achieve adequate surface cure when irradiated with UV LED light.

Upon curing, UV-curable inkjet inks are typically exposed to short and long wavelength radiation. Short wavelength radiation is scattered in the upper layers of the inkjet ink and does not penetrate deeply into the ink whereas long wavelength radiation is not scattered and is thus able to penetrate deeply into the ink. Therefore, typical UV-curable inkjets inks contain a combination of short and long wavelength-absorbing photoninitiators to achieve surface and through cure, respectively.

Typical surface cure photoinitiators are benzophenone or an alpha hydroxy ketone such as Irgacure 184, which strongly absorb incident radiation below 300 nm and initiate surface cure. Typical through cure photoinitiators are an acyl phosphine oxide such as TPO or Irgacure 819, which strongly absorb incident radiation above 300 nm and initiate through cure. Alternatively, sensitisers such as ITX are able to absorb incident radiation above 300 nm by forming an excited state that transfers its energy to through cure photoinitiators.

Surface cure is more problematic than through cure owing to the absorption of oxygen at the surface of an inkjet ink. Absorbed oxygen inhibits polymerisation by the formation of unreactive peroxide radicals from any reactive radicals, reducing initiation and propagation. Problematic surface cure is further exacerbated for UV-curable inks that are cured with LEDs. In this regard, the wavelength output of an LED is typically 360-400 nm i.e. long wavelength radiation that is suitable for absorption by through cure photoinitiators. Therefore, even if surface cure photoinitiators are present in a UV-curable ink, the wavelength output of the LED is such that no short wavelength radiation will be emitted that is required for surface cure.

It is believed that by including a resin in the ink, less polymerisation is required at the surface of the ink. Therefore, although the wavelength output of UV LED light is longer than that required for absorption by surface cure photoinitiators, good surface cure is still achieved.

In addition, this difference in surface cure between inks with and without a resin having a glass transition temperature of from 25 to 105° C. is only observed when irradiating with UV LED light. It is not observed when curing the inks with other UV radiation sources, such as conventional UV mercury arc lamps. In fact, inks which comprise other radiation-curable material (other than the resin used in the ink of the method of the present invention) can achieve the same result for surface cure when using sources of UV radiation other than UV LED light as inks which comprise the resin used in the present invention. This is because surface cure is more problematic when using UV LED light owing to the wavelength output of the UV LED light.

The inkjet ink used in the method of the present invention comprises a resin having a glass transition temperature of from 25 to 105° C. The resin preferably has a glass transition temperature of from 40 to 105° C., more preferably from 50 to 100° C. and most preferably 70 to 100° C. It has surprisingly been found that surface cure speed is improved when using a resin having the glass transition temperature of from 25 to 105° C.

The glass transition temperature may be determined by Differential Scanning calorimetry (DSC) using, for example, a Perkin Elmer Diamond DSC.

The resin of the invention can be active or passive. Active resins contain radiation-curable functional groups which enter into the curing process. Typically, active resins contain a polymerised backbone with radiation-curable side-chains, such as acrylated acrylic resin which contains an acrylic backbone with radiation-curable acrylate side-chains. Passive resins are resins which do not enter into the curing process, i.e. the resin is free of functional groups which polymerise under the curing conditions to which the ink is exposed. In other words, the resin is not a radiation-curable material. Examples of passive resins include an epoxy resin, a polyester resin, a vinyl resin, a ketone resin, an aldehyde resin, a nitrocellulose resin, a phenoxy resin, an acrylate resin and combinations thereof. In a preferred embodiment, the resin is a passive resin and therefore, preferably the resin is selected from an epoxy resin, a polyester resin, a vinyl resin, a ketone resin, an aldehyde resin, a nitrocellulose resin, a phenoxy resin, an acrylate resin and combinations thereof.

The resin preferably has a weight-average molecular weight of 3,000 Da or above, as determined by GPC with polystyrene standards. The weight-average molecular weight is preferably below 200,000 Da. Particularly preferred resins are Paraloid A11 from Rohm and Haas, Br5115 from Dianal, Paraloid DM55 from Dow Chemical, Polyester LTH from Evonik and Laropal A81 available from BASF.

The ink used in the method of the present invention preferably comprises from 1 to 5% by weight of resin, based on the total weight of the ink. It is surprising that the inclusion of such quantities of resin in the ink provides improved surface cure of the ink when exposed to UV LED light.

The inkjet ink used in the method of inkjet printing of the present invention further comprises a radiation-curable material. This radiation-curable material is not limited and can include any radiation-curable material readily available and known in the art in inkjet inks. By "radiation-curable" is meant a material that polymerises or crosslinks when exposed to actinic radiation, in the presence of a photoinitiator.

The radiation-curable material may be selected from monofunctional (meth)acrylate monomer, multifunctional (meth)acrylate monomer, radiation-curable oligomer, N-vinyl amides, N-(meth)acryloyl amines and combinations thereof.

Monofunctional (meth)acrylate monomers are well known in the art and are preferably the esters of acrylic acid. A detailed description is therefore not required. Preferred examples include phenoxyethyl acrylate (PEA), cyclic TMP formal acrylate (CTFA), isobornyl acrylate (IBOA), tetrahydrofurfuryl acrylate (THFA), 2-(2-ethoxyethoxy)ethyl acrylate, octadecyl acrylate (ODA), tridecyl acrylate (TDA), isodecyl acrylate (IDA), lauryl acrylate and combinations thereof. The preferred examples of monofunctional (meth)acrylate monomers have the following chemical structures:

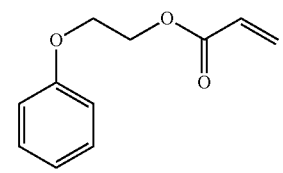

Phenoxyethyl acrylate (PEA), mol wt 192 g/mol

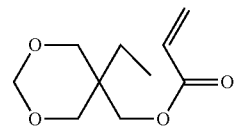

Cyclic TMP formal acrylate (CTFA)
mol wt 200 g/mol

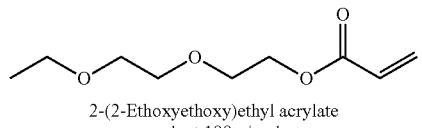

2-(2-Ethoxyethoxy)ethyl acrylate
mol wt 188 g/mol

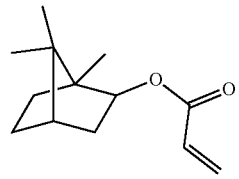 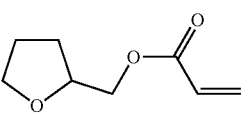

Isobornyl acrylate (IBOA)    Tetrahydrofurfuryl acrylate (THFA)
mol wt 208 g/mol              mol wt 156 g/mol

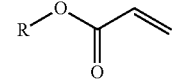 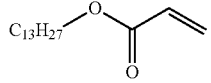

R = $C_8H_{17}/C_{10}H_{21}$     Tridecyl acrylate (TDA)
Octadecyl acrylate (ODA)         mol 254 g/mol
mol wt 200 g/mol

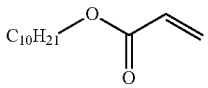 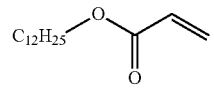

Isodecyl acrylate (IDA)    Lauryl acrylate
mol wt 212 g/mol            mol wt 240 g/mol The substituents of the monofunctional monomers are not limited other than by the constraints imposed by the use in an ink-jet ink, such as viscosity, stability, toxicity etc. The substituents are typically alkyl, cycloalkyl, aryl and combinations thereof, any of which may be interrupted by heteroatoms. Non-limiting examples of substituents commonly used in the art include $C_{1-18}$ alkyl, $C_{3-18}$ cycloalkyl, $C_{6-10}$ aryl and combinations thereof, such as $C_{6-10}$ aryl- or $C_{3-18}$ cycloalkyl-substituted $C_{1-18}$ alkyl, any of which may be interrupted by 1-10 heteroatoms, such as oxygen or nitrogen, with nitrogen further substituted by any of the above described substituents. The substituents may together also form a cyclic structure. (The same groups may also be used for multifunctional monomers.)

Monomers typically have a molecular weight of less than 600, preferably more than 200 and less than 450. They typically have a viscosity of less than 20 mPas at 25° C. Monomer viscosities can be measured using an ARG2 rheometer manufactured by T.A. Instruments, which uses a 40 mm oblique/2° steel cone at 25° C. with a shear rate of 25 $s^{-1}$.

Mixtures of (meth)acrylates may also be used.

Preferably, the ink comprises 20-80% by weight of a monofunctional (meth)acrylate monomer, based on the total weight of the ink.

Multifunctional (meth)acrylate monomers are well known in the art and a detailed description is therefore not required. Preferred examples include hexanediol diacrylate, polyethylene glycol diacrylate (for example tetraethyleneglycol diacrylate), dipropylene glycol diacrylate, neopentylglycol diacrylate, 3-methyl pentanediol diacrylate, the acrylate esters of ethoxylated or propoxylated glycols and polyols, for example, propoxylated neopentyl glycol diacrylate, trimethylolpropane triacrylate, pentaerythritol triacrylate, tri (propylene glycol) triacrylate, bis(pentaerythritol) hexaacrylate, and the acrylate esters of ethoxylated or propoxylated glycols and polyols, for example, ethoxylated trimethylolpropane triacrylate, and combinations thereof.

In addition, suitable multifunctional methacrylate monomers also include esters of methacrylic acid (i.e. methacrylates), such as hexanediol dimethacrylate, triethyleneglycol dimethacrylate, diethyleneglycol dimethacrylate, ethyleneglycol dimethacrylate, 1,4-butanediol dimethacrylate, trimethylolpropane trimethacrylate and combinations thereof. Mixtures of (meth)acrylates may also be used.

Preferably, the ink may comprise 5-25% by weight of a multifunctional (meth)acrylate monomer, based on the total weight of the ink.

Mixtures of (meth)acrylates may also be used.

(Meth)acrylate is intended herein to have its standard meaning, i.e. acrylate and/or methacrylate. Monofunctional is intended to have its standard meaning, i.e. one group, which takes part in the polymerisation reaction on curing. Multifunctional is also intended to have its standard meaning, i.e. two or more groups, which take part in the polymerisation reaction on curing. They hence have a functionality of two or higher. Functionalities of two, three or four are preferred and preferably the multifunctional (meth)acrylate monomer is a difunctional or trifunctional monomer.

The radiation-curable material of the ink used in the method of the present invention may comprise a radiation-curable (i.e. polymerisable) oligomer, such as a (meth) acrylate oligomer. Any radiation-curable oligomer that is compatible with the other ink components is suitable for use in the ink. Thus, the ink formulator is able to select from a wide range of suitable oligomers.

The term "curable oligomer" has its standard meaning in the art, namely that the component is partially reacted to form a pre-polymer having a plurality of repeating monomer units, which is capable of further polymerisation. The oligomer preferably has a weight-average molecular weight of at least 600 Da. The weight-average molecular weight is preferably below 3,000 Da. Molecular weights (weight-average) can be calculated if the structure of the oligomer is known or molecular weights can be measured using gel permeation chromatography using polystyrene standards.

The oligomers may possess different degrees of functionality, and a mixture including combinations of mono, di, tri and higher functionality oligomers may be used. The degree of functionality of the oligomer determines the degree of crosslinking and hence the properties of the cured ink. The oligomer is preferably multifunctional meaning that it contains on average more than one reactive functional group per molecule. The average degree of functionality is preferably from 2 to 6.

Radiation-curable oligomers comprise a backbone, for example a polyester, urethane, epoxy or polyether backbone, and one or more radiation-curable groups. The oligomer preferably comprises a urethane backbone. The polymerisable group can be any group that is capable of polymerising upon exposure to radiation. Preferably the oligomers are (meth)acrylate oligomers.

Particularly preferred radiation-curable oligomers are urethane acrylate oligomers as these have excellent adhesion and elongation properties. Most preferred are di-, tri-, tetra-, penta- or hexafunctional urethane acrylates, particularly difunctional urethane acrylate or hexafunctional urethane acrylates as these yield films with good solvent resistance.

Other suitable examples of radiation-curable oligomers include epoxy based materials such as bisphenol A epoxy acrylates and epoxy novolac acrylates, which have fast cure speeds and provide cured films with good solvent resistance.

In one embodiment, the radiation-curable oligomer polymerises by free-radical polymerisation.

The radiation-curable oligomer cures upon exposure to radiation in the presence of a photoinitiator to form a crosslinked, solid film.

The ink may comprise 1 to 12 wt %, preferably 2 to 5 wt %, of a radiation-curable oligomer, based on the total weight of the ink.

α,β-Unsaturated ether monomers can polymerise by free-radical polymerisation and may be useful in the ink used in the method of the present invention for reducing the viscosity of the ink when used in combination with one or more (meth)acrylate monomers. Examples are well known in the art and include vinyl ethers such as triethylene glycol divinyl ether, diethylene glycol divinyl ether, 1,4-cyclohexanedimethanol divinyl ether and ethylene glycol monovinyl ether. Mixtures of α,β-unsaturated ether monomers may be used.

N-Vinyl amides and N-(meth)acryloyl amines may also be used in the ink used in the method of the present invention. N-vinyl amides are well-known monomers in the art and a detailed description is therefore not required. N-vinyl amides have a vinyl group attached to the nitrogen atom of an amide which may be further substituted in an analogous manner to the (meth)acrylate monomers. Preferred examples are N-vinyl caprolactam (NVC) and N-vinyl pyrrolidone (NVP). Similarly, N-acryloyl amines are also well-known in the art. N-acryloyl amines also have a vinyl group attached to an amide but via the carbonyl carbon atom and again may be further substituted in an analogous manner to the (meth)acrylate monomers. A preferred example is N-acryloylmorpholine (ACMO).

The ink used in the method of the present invention comprises a photoinitiator. Preferably, the photoinitiator is a free-radical photoinitiator which can be selected from any of those known in the art. For example, benzophenone, 1-hydroxycyclohexyl phenyl ketone, 1-[4-(2-hydroxyethoxy)-phenyl]-2-hydroxy-2-methyl-1-propane-1-one, 2-benzyl-2-dimethylamino-(4-morpholinophenyl)butan-1-one, isopropyl thioxanthone, benzil dimethylketal, bis(2,6-dimethylbenzoyl)-2,4,4-trimethylpentylphosphine oxide, phenylbis (2,4,6-trimethylbenzoyl)-phosphine oxide or combinations thereof. Such photoinitiators are known and commercially available such as, for example, under the trade names Irgacure and Darocur (from Ciba) and Lucerin (from BASF).

The ink used in the method of the present invention may also include radiation-curable material, which is capable of polymerising by cationic polymerisation. Suitable materials include, oxetanes, cycloaliphatic epoxides, bisphenol A epoxides, epoxy novolacs and the like. The radiation-curable material according to this embodiment may comprise a mixture of cationically curable monomer and oligomer. For example, the radiation-curable material may comprise a mixture of an epoxide oligomer and an oxetane monomer. In the embodiment where the ink comprises radiation-curable material, which polymerises by cationic polymerisation, the ink must also comprise a cationic photoinitiator.

In the case of a cationically curable system, any suitable cationic initiator can be used, for example sulfonium or iodonium based systems. Non limiting examples include: Rhodorsil PI 2074 from Rhodia; MC AA, MC BB, MC CC, MC CC PF, MC SD from Siber Hegner; UV9380c from Alfa Chemicals; Uvacure 1590 from UCB Chemicals; and Esacure 1064 from Lamberti spa.

Preferably however, the ink used in the method of the invention cures by free-radical polymerisation only and hence the ink is substantially free of radiation-curable material, which polymerises by cationic polymerisation.

The photoinitiator present in the ink used in the method of the present invention is preferably tailored for UV LED light and preferably comprises a photoinitiator package comprising two or more photoinitiators. Preferably, the photoinitiator comprises a combination of an acyl phosphine oxide, such as TPO and BAPO, and a thioxanthone photoinitiator, such as ITX. In a preferred embodiment, the amount of acyl phosphine oxide present in the ink is 4-12% by weight and the amount of thioxanthone photoinitiator is 0.5-5.0% by weight, based on the total weight of the ink.

Preferably, the total amount of photoinitiator is present in an amount of 1 to 20% by weight, preferably 2 to 15% by weight, based on the total weight of the ink.

The inkjet ink used in the method of the present invention preferably dries primarily by curing, i.e. by the polymerisation of the monomers present, as discussed hereinabove, and hence is a curable ink. The ink does not, therefore, require the presence of water or a volatile organic solvent to effect drying of the ink. Accordingly, the inkjet ink is preferably substantially free of water and volatile organic solvents. Preferably, the inkjet ink comprises less than 5 wt % of water and volatile organic solvent combined, preferably less than 3% by weight combined, more preferably, less than 2% by weight combined and most preferably less than 1% by weight combined, based on the total weight of the ink. Some water will typically be absorbed by the ink from the air and solvents may be present as impurities in the components of the inks, but such low levels are tolerated.

The ink used in the method of the present invention may also comprise at least one colouring agent. The colouring agent may be either dissolved or dispersed in the liquid medium of the ink. Preferably the colouring agent is a dispersible pigment, of the types known in the art and commercially available such as under the trade-names Paliotol (available from BASF plc), Cinquasia, Irgalite (both available from Ciba Speciality Chemicals) and Hostaperm (available from Clariant UK). The pigment may be of any desired colour such as, for example, Pigment Yellow 13, Pigment Yellow 83, Pigment Red 9, Pigment Red 184, Pigment Blue 15:3, Pigment Green 7, Pigment Violet 19, Pigment Black 7. Especially useful are black and the colours required for trichromatic process printing. Mixtures of pigments may be used.

In one aspect the following pigments are preferred. Cyan: phthalocyanine pigments such as Phthalocyanine blue 15.4. Yellow: azo pigments such as Pigment yellow 120, Pigment yellow 151 and Pigment yellow 155. Magenta: quinacridone pigments, such as Pigment violet 19 or mixed crystal quinacridones such as Cromophtal Jet magenta 2BC and Cinquasia RT-355D. Black: carbon black pigments such as Pigment black 7.

Pigment particles dispersed in the ink should be sufficiently small to allow the ink to pass through an inkjet nozzle, typically having a particle size less than 8 µm, preferably less than 5 µm, more preferably less than 1 µm and particularly preferably less than 0.5 µm.

The colorant is preferably present in an amount of 20% by weight or less, preferably 10% by weight or less, more preferably 8% by weight or less, based on the total weight of the ink. A higher concentration of pigment may be required for white inks, however, for example up to and including 30% by weight, or 25% by weight based on the total weight of the ink.

The inks may be in the form of a multi-chromatic inkjet ink set, which typically comprises a cyan ink, a magenta ink, a yellow ink and a black ink (a so-called trichromatic set). The inks in a trichromatic set can be used to produce a wide range of colours and tones.

The amounts by weight provided herein are based on the total weight of the ink.

The inkjet ink preferably exhibits a desirable low viscosity (200 mPas or less, preferably 100 mPas or less and more preferably 50 mPas or less at 25° C.).

In order to produce a high quality printed image a small jetted drop size is desirable. Furthermore, small droplets have a higher surface area to volume ratio when compared to larger drop sizes, which facilitates evaporation of solvent from the jetted ink. Small drop sizes therefore offer advantages in drying speed. Preferably the inkjet ink of the invention is jetted at drop sizes below 50 picolitres and more preferably below 30 picolitres.

To achieve compatibility with print heads that are capable of jetting drop sizes of 50 picolitres or less, a low viscosity ink is required. A viscosity of 50 mPas or less at 25° C. is preferred.

Ink viscosity may be measured using a Brookfield viscometer fitted with a thermostatically controlled cup and spindle arrangement, such as a DV1 low-viscosity viscometer running at 20 rpm at 25° C. with spindle 00.

Other components of types known in the art may be present in the ink to improve the properties or performance. These components may be, for example, surfactants, defoamers, dispersants, stabilisers against deterioration by heat or light, reodorants, amine synergists, flow or slip aids, biocides and identifying tracers. In a preferred embodiment, the inkjet ink used in the method of the present invention comprises an amine synergist, such as EDB.

Print heads account for a significant portion of the cost of an entry level printer and it is therefore desirable to keep the number of print heads (and therefore the number of inks in the ink set) low. Reducing the number of print heads can reduce print quality and productivity. It is therefore desirable to balance the number of print heads in order to minimise cost without compromising print quality and productivity.

The ink may be prepared by known methods such as stirring with a high-speed water-cooled stirrer, or milling on a horizontal bead-mill.

As discussed above, inkjet printing is well known in the art and a detailed description is not required. The ink is jetted from one or more reservoirs or printing heads through narrow nozzles on to a substrate to form a printed image. The substrate is not limited. Examples of substrates include those composed of PVC, polyester, polyethylene terephthalate (PET), PETG, polyethylene and polypropylene. The printed image is cured by exposure to UV LED light.

Compared to conventional mercury lamp UV sources, LEDs have a narrow wavelength output and emit radiation typically centred around 365 or 395 nm. Further, LEDs have a longer lifetime and exhibit no change in the power/wavelength output over time. LEDs also have the advantage of switching on instantaneously with no thermal stabilisation time and their use results in minimal heating of the substrate.

In the present invention, the preferred wavelength of the UV radiation emitted by the UV LED light is 360-400 nm.

The invention will now be described with reference to the following examples, which are not intended to be limiting.

EXAMPLES

Example 1

Inkjet inks were prepared according to the formulations set out in Table 1. The inkjet ink formulations were prepared by mixing the components in the given amounts. Amounts are given as weight percentages based on the total weight of the ink.

TABLE 1

| Component | Ink 1 | Comparative ink 2 | Comparative ink 3 | Comparative ink 4 |
|---|---|---|---|---|
| Phenoxyethyl acrylate | 24.37 | 24.37 | 24.37 | 24.37 |
| Isobornyl acrylate | 11.30 | 11.30 | 11.30 | 11.30 |
| Cyclic TMP formal acrylate | 18.40 | 20.97 | 18.40 | 18.40 |
| N-vinyl caprolactam | 15.67 | 15.67 | 15.67 | 15.67 |
| Isodecyl acrylate | 4.75 | 4.75 | 4.75 | 4.75 |
| Genomer 5695 (Amine modified urethane acrylate oligomer) | 1.90 | 1.90 | 1.90 | 1.90 |
| UV12 (Stabiliser) | 0.39 | 0.39 | 0.39 | 0.39 |
| Brl13 (Acrylic passive resin) | 2.57 | | | |
| CN964A85 (urethane acrylate oligomer) | | | 2.57 | |
| Bis(pentaerythritol) hexaacrylate | | | | 2.57 |
| Cyan pigment dispersion | 6.00 | 6.00 | 6.00 | 6.00 |
| Irg 184 (Photoinitiator) | 1.79 | 1.79 | 1.79 | 1.79 |
| Benzophenone | 2.73 | 2.73 | 2.73 | 2.73 |
| Bis(2,6-dimethylbenzoyl)-2,4,4-trimethylpentylphosphine oxide | 7.61 | 7.61 | 7.61 | 7.61 |
| EDB (Amine synergist) | 0.81 | 0.81 | 0.81 | 0.81 |
| Isopropyl thioxanthone | 0.76 | 0.76 | 0.76 | 0.76 |
| Byk307 (Surfactant) | 0.95 | 0.95 | 0.95 | 0.95 |
| Total | 100.00 | 100.00 | 100.00 | 100.00 |

Ink 1 is an example of the invention and has the required combination of components, including an acrylic passive resin having a glass transition temperature of 78° C.

In contrast, comparative inks 2-4 fall outside of the scope of the invention. To provide comparative inks 2-4, the resin of ink 1 has been removed and replaced by an alternative component. In comparative ink 2, the resin has been replaced with cyclic TMP formal acrylate. In comparative ink 3, the resin has been replaced with CN964A85 (an urethane acrylate oligomer). In comparative ink 4, the resin has been replaced with bis(pentaerythritol) hexaacrylate. These inks therefore fall outside the scope of the invention.

Ink 1 and comparative inks 2-4 were tested for their surface cure when exposed to UV LED light and a medium pressure mercury arc lamp. The results can be seen in Tables 2 and 3, respectively. The surface cure when exposed to UV LED light is measured by the number of passes required under an 8 W Baldwin LED lamp at full power having a belt speed of 40 m/min to achieve a finish that shows no sign of sticking/offsetting to a strip of photopaper. The resultant film should therefore be tack free. The surface cure when exposed to a medium pressure mercury arc lamp is measured by the number of passes required under a Fusion Lighthammer 6 with a 200 W/cm medium pressure mercury lamp, operated at 25% of maximum power with belt speed 40 m/min, to achieve a finish that shows no sign of sticking/offsetting to a strip of photopaper. Once again, the resultant film should be tack free.

TABLE 2

| Ink | Number of passes under UV LED lamp for tack free film |
|---|---|
| Ink 1 | 2 |
| Comparative ink 2 | 6 |
| Comparative ink 3 | 6 |
| Comparative ink 4 | 7 |

TABLE 3

| Ink | Number of passes under medium pressure mercury arc lamp for tack free film |
|---|---|
| Ink 1 | 2 |
| Comparative ink 2 | 3 |
| Comparative ink 3 | 3 |
| Comparative ink 4 | 2 |

As is apparent from Table 2, ink 1 requires only 2 passes under an UV LED lamp to provide a tack free film. Thus, ink 1 has excellent surface cure when exposed to UV LED light. The surface cure speed of ink 1 can be compared with that of comparative inks 2-4, which do not contain an inert resin. As can be seen in Table 2, comparative inks 2-4 give similar results for surface cure, namely 6, 6 and 7 passes under an UV LED lamp to provide tack free cure, respectively. This is much more than the 2 passes required for ink 1. It is clear therefore that ink 1 which comprises a resin having a glass transition temperature of from 25 to 105° C. performs far better with respect to surface cure using UV LED light than the comparative inks which do not have such a resin present in the inks.

Table 3 shows that when the same test as Table 2 is repeated, but using a medium pressure mercury arc lamp instead of an UV LED lamp, very little difference in surface cure response is noted between ink 1 and comparative inks 2-4. Thus, the improved surface cure of ink 1 is only observed using an UV LED source.

Example 2

The resin of ink 1 was replaced by alternative resins having glass transition temperatures of from 25 to 105° C. to provide inks 5-8. The resins are listed in Table 4 below.

Inks 5-8 were also tested for their surface cure when exposed to UV LED light following the same test as for Example 1 hereinabove. The results of the surface cure can also be seen in Table 4 hereinbelow.

TABLE 4

| Inks | Resin | Glass transition temperature (° C.) | Number of passes under UV LED lamp for tack free film |
|---|---|---|---|
| Ink 5 | Paraloid A11 (Acrylic passive resin) | 100 | 2 |
| Ink 6 | Polyester LTH (Polyester passive resin) | 70 | 3 |
| Ink 7 | Paraloid DM55 (Acrylic passive resin) | 70 | 4 |
| Ink 8 | Laropal A81 (Aldehyde passive resin) | 49 | 4 |

As is apparent from Table 4, ink 5 requires only 2 passes under an UV LED lamp to provide a tack free film, ink 6 requires only 3 passes under an UV LED lamp to provide a tack free film and inks 7-8 require 4 passes under an UV LED lamp to provide a tack free film. This once again shows improved surface cure when compared to comparative inks 2-4 of Example 1, which require 6, 6 and 7 passes under an UV LED lamp to provide tack free cure, respectively.

What is claimed is:

1. A method of inkjet printing comprising:
inkjet printing an inkjet ink onto a substrate, wherein the inkjet ink comprises a resin having a glass transition temperature of from 25 to 105° C., a radiation-curable material, wherein the radiation-curable material comprises N-vinyl caprolactam (NVC) and a multifunctional radiation-curable oligomer, wherein the multifunctional radiation-curable oligomer is present in an amount of 1-12% by weight, based on the total weight of the inkjet ink, and a photoinitiator;
and exposing the inkjet ink to UV LED light to cure the inkjet ink, wherein the wavelength of the UV radiation emitted by the UV LED light is 360-400 nm.

2. A method of inkjet printing as claimed in claim 1, wherein the resin has a glass transition temperature of from 40 to 105° C.

3. A method of inkjet printing as claimed in claim 1, wherein the resin is a passive resin.

4. A method of inkjet printing as claimed in claim 3, wherein the resin is selected from an epoxy resin, a polyester resin, a vinyl resin, a ketone resin, an aldehyde resin, a nitrocellulose resin, a phenoxy resin, an acrylate resin and combinations thereof.

5. A method of inkjet printing as claimed in claim 1, wherein the resin has a weight-average molecular weight of 3,000 Da or above.

6. A method of inkjet printing as claimed in claim 1, wherein the ink comprises from 1 to 5% by weight of resin, based on the total weight of the ink.

7. A method of inkjet printing as claimed in claim 1, wherein the ink comprises 1 to 20% by weight of the photoinitiator, based on the total weight of the ink.

8. A method of inkjet printing as claimed in claim 1, wherein the photoinitiator is a free radical photoinitiator and is preferably selected from benzophenone, 1-hydroxycyclohexyl phenyl ketone, 1-[4-(2-hydroxyethoxy)-phenyl]-2-hydroxy-2-methyl-1-propane-1-one, 2-benzyl-2-dimethylamino-(4-morpholinophenyl)butan-1-one, isopropyl thioxanthone, benzil dimethylketal, bis(2,6-dimethylbenzoyl)-2,4,4-trimethylpentylphosphine oxide, phenylbis (2,4,6-trimethylbenzoyl)-phosphine oxide and combinations thereof.

9. A method of inkjet printing as claimed in claim 1, wherein the photoinitiator comprises two or more photoinitiators, preferably a combination of an acyl phosphine oxide photoinitiator and a thioxanthone photoinitiator.

10. A method of inkjet printing as claimed in claim 9, wherein the photoinitiator comprises a combination of an acyl phosphine oxide photoinitiator and a thioxanthone photoinitiator, wherein the acyl phosphine oxide photoinitiator is present in 4-12% by weight, based on the total weight of the ink and the thioxanthone photoinitiator is present in 0.5-50% by weight, based on the total weight of the ink.

11. A method of inkjet printing as claimed in claim 9, wherein the ink is substantially free of water and volatile organic solvents.

12. The method of inkjet printing as claimed in claim 2, wherein the resin has a glass transition temperature of from 50 to 100° C.

13. The method of inkjet printing as claimed in claim 2, wherein the resin has a glass transition temperature of from 70 to 100° C.

* * * * *